(12) United States Patent
Dixon (10) Patent No.: US 10,757,780 B2
(45) Date of Patent: Aug. 25, 2020

(54) OPERATING DEVICE HAVING A TEST SWITCH AND STATUS INDICATOR

(71) Applicant: TRIDONIC GMBH & CO KG, Dornbirn (AT)

(72) Inventor: David Dixon, Wallsend (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/346,886

(22) PCT Filed: Oct. 3, 2017

(86) PCT No.: PCT/EP2017/075031
§ 371 (c)(1),
(2) Date: May 2, 2019

(87) PCT Pub. No.: WO2018/099630
PCT Pub. Date: Jun. 7, 2018

(65) Prior Publication Data
US 2020/0059997 A1    Feb. 20, 2020

(30) Foreign Application Priority Data
Nov. 30, 2016 (DE) .................... 20 2016 007 323 U (51) Int. Cl.
*H05B 33/08* (2020.01)
*H05B 45/42* (2020.01)
(Continued)

(52) U.S. Cl.
CPC ............ *H05B 45/37* (2020.01); *H02J 7/0068* (2013.01); *H02J 9/02* (2013.01); *H02J 9/061* (2013.01)

(58) Field of Classification Search
CPC .... G08B 7/062; G01R 19/155; G01R 31/024; G01R 31/28; Y10T 307/615;
(Continued)

(56) References Cited

U.S. PATENT DOCUMENTS 3,739,226 A * 6/1973 Seiter ...................... F21S 9/022
315/86
6,788,000 B2 * 9/2004 Appelberg ............. G08B 7/062
315/86
(Continued)

FOREIGN PATENT DOCUMENTS

AT          14625       2/2016
DE         100 389 69   3/2002
(Continued)

OTHER PUBLICATIONS

PCT Search Report dated Nov. 8, 2017 in parent PCT application PCT/EP2017/075031.
(Continued)

*Primary Examiner* — Henry Luong
(74) *Attorney, Agent, or Firm* — Andrus Intellectual Property Law (57) ABSTRACT

Arrangement comprising an operating device (1) for emergency lighting and a first light-emitting diode (12), a second light-emitting diode (13, and a test switch (11), wherein the operating device (1) comprises a first connection (9.1) and a second connection (9.2), wherein the first light emitting diode (12) and the second light emitting diode (13) are connected in parallel between the first connection (9.1) and the second connection (9.2).

7 Claims, 3 Drawing Sheets

(51) Int. Cl.
*H05B 45/37* (2020.01)
*H02J 7/00* (2006.01)
*H02J 9/02* (2006.01)
*H02J 9/06* (2006.01)

(58) Field of Classification Search
CPC .......... Y10T 307/625; H05B 33/0815; H05B 33/0872; H02J 7/0068; H02J 9/00; H02J 9/02; H02J 9/04; H02J 9/061; H02J 9/065; F21S 9/022
See application file for complete search history.

(56) References Cited

U.S. PATENT DOCUMENTS

| | | |
|---|---|---|
| 2003/0030463 A1 | 2/2003 | Gergintschew |
| 2006/0267861 A1 | 11/2006 | Yonezawa |
| 2007/0075872 A1 | 4/2007 | Zhang |
| 2015/0194843 A1* | 7/2015 | Singer ............... H02J 9/061 315/86 |
| 2015/0214785 A1 | 7/2015 | Jagjitpati et al. |

FOREIGN PATENT DOCUMENTS

| | | |
|---|---|---|
| DE | 10 2008 056 188 | 5/2010 |
| DE | 10 2009 035 125 | 2/2011 |
| DE | 10 2012 214 832 | 2/2014 |
| EP | 1954105 | 8/2008 |
| EP | 2287996 | 2/2011 |

OTHER PUBLICATIONS

German search report dated Aug. 23, 2017 in priority German application 20 2016 007 323.1.

* cited by examiner

OPERATING DEVICE HAVING A TEST SWITCH AND STATUS INDICATOR

CROSS REFERENCE TO RELATED APPLICATIONS

The present application is the U.S. national stage application of International Application PCT/EP2017/075031 filed Oct. 3, 2017, which international application was published on Jun. 7, 2018 as International Publication WO 2018/099630 A1. The international application claims priority to German patent application 20 2016 007 323.1 filed Nov. 30, 2016.

FIELD OF THE INVENTION

The invention lies in the field of emergency lighting and relates, in particular, to an arrangement comprising an operating device for emergency lights with a test switch, a status display, and corresponding emergency lighting.

BACKGROUND OF THE INVENTION

For emergency lighting systems, operating devices (ballasts) are used for the operation of connected lights through an additional power supply, which ensures the operation of the connected lights for a predetermined period of time even in the event of a mains power failure. The power supply is maintained in the event of failure of the primary mains power supply by means of energy stored in accumulators for a rated operating time, in order, for example, to allow persons to leave a building with a specific illumination for the rated operating time.

The functionality of the emergency lighting must be checked at regular intervals as part of function tests, as well as continuously during operation as part of self-tests. Such a function test is triggered, for example, by actuating a test switch (test button) connected externally to an emergency lighting operating device. The connection of the test switch to the emergency light operating device is two-wire, often by means of plug connectors, and therefore requires two externally accessible connection options to the emergency light operating device.

The operating state (status) of an emergency lighting system is usually signaled externally. To this end, a green light emitting diode (LED) signals that the emergency lighting system is operational, while a detected fault in the emergency lighting system is signaled by a red LED. Conventional operating devices, therefore, have at least two additional external connections for the LEDs for the status display.

Thus, emergency lighting operating devices have at least six external connections, each of which requires corresponding space in a housing, and corresponding cabling related to the installation of an emergency lighting system.

SUMMARY OF THE INVENTION

The invention is, therefore, based on the object of reducing the complexity of the operating devices for emergency lighting systems.

The object is achieved by an arrangement comprising an operating device and a first light-emitting diode, a second light-emitting diode, and a test switch, wherein the arrangement has the features of independent claim 1, and emergency lighting according to the invention.

The arrangement comprises an operating device for emergency lighting, a first light-emitting diode, a second light-emitting diode, and a test switch. The arrangement is characterized in that the operating device comprises a first connector and a second connector, wherein the first light-emitting diode and the second light-emitting diode are connected in parallel between the first connector and the second connector. The test switch is preferably connected in parallel to the first light-emitting diode and the second light-emitting diode, and is arranged to short-circuit the first connector to the second connector when actuated.

The inventive arrangement reduces the number of necessary external connections of the operating device to a total of only two compared to the original six connections. Thus, the space requirements are accordingly reduced to those of the housing of the operating device. As a result of the omitted connections, such as sockets or connectors, the unit costs of the individual operating device are also reduced. The cabling effort for the operating device is also reduced by virtue of the reduced number of lines to be connected, which is reflected in reduced installation costs. The reduced number of external connections allows more freedom in the design of the operating device housing.

Further advantageous developments of the invention are the subject of the dependent claims.

A preferred arrangement comprises the operating device with a constant current source, wherein the constant current source is designed to impose a constant current having a first polarity and a second polarity opposite to the first polarity, between the first connector and the second connector.

An advantageous arrangement according to the invention provides the operating device with a control circuit, wherein the control circuit is designed to detect a short circuit between the first connector and the second connector.

The arrangement according to an advantageous embodiment comprises a control circuit of the operating device, wherein the control circuit is designed to detect a short circuit between the first connector and the second connector, by determining that a voltage between the first connector and the second connector is below a threshold for a limited constant current between the first connector and the second connector.

In an embodiment of the arrangement according to the invention, the control circuit is designed to determine a short circuit between the first connector and the second connector on the basis of a control parameter related to the constant current source, in particular based on a timing of a switch of the constant current source.

Another arrangement according to an embodiment shows the control circuit configured to control the constant current source by imposing either the first constant current of the first polarity or the second constant current of the second polarity, between the first connector and the second connector.

A further embodiment of the arrangement according to the invention is characterized in that the constant current source is designed to switch between the first current of the first polarity or the second current of the second polarity. The constant current source can comprise a first constant current source and a second constant current source, wherein the first or the second constant current source can be alternatively connected to the first connector and the second connector.

The first connector and the second connector can be connected via an OR link of an evaluation circuit, wherein the evaluation circuit can signal an operation of the test switch when the first connector and the second connector are short-circuited and are thus at the same potential.

In a particularly preferred embodiment of the arrangement according to the invention, the first light-emitting diode, the second light-emitting diode, and the test switch are designed to be integrated in a common module, in particular in a common module housing.

Thus, a reduced number of units for the arrangement according to the invention is achieved compared to the usual separately operated test button on the one hand, and status displays on the other hand, in particular due to the reduction according to the invention to two, compared to the original six, connections is possible and particularly advantageous. The two connections from the operating device to the assembly can be formed via the first connection and the second connection, for example, by means of plug connectors or as crimp connections. Thus, the logistics are correspondingly reduced by the correspondingly smaller number of components to be controlled separately, while the costs of component manufacturing for the emergency lighting system as well as the costs associated with the installation are correspondingly reduced.

The object is also achieved by emergency lighting having at least one emergency lighting means and an arrangement according to the invention.

BRIEF DESCRIPTION OF THE DRAWINGS

Further objects, advantages, features and applications of the invention will become apparent from the following description of an embodiment with reference to the accompanying figure. In this case, all described features can form the object of the invention defined in the appended claims alone or in an advantageous combination, wherein:

DETAILED DESCRIPTION

Figure 1:
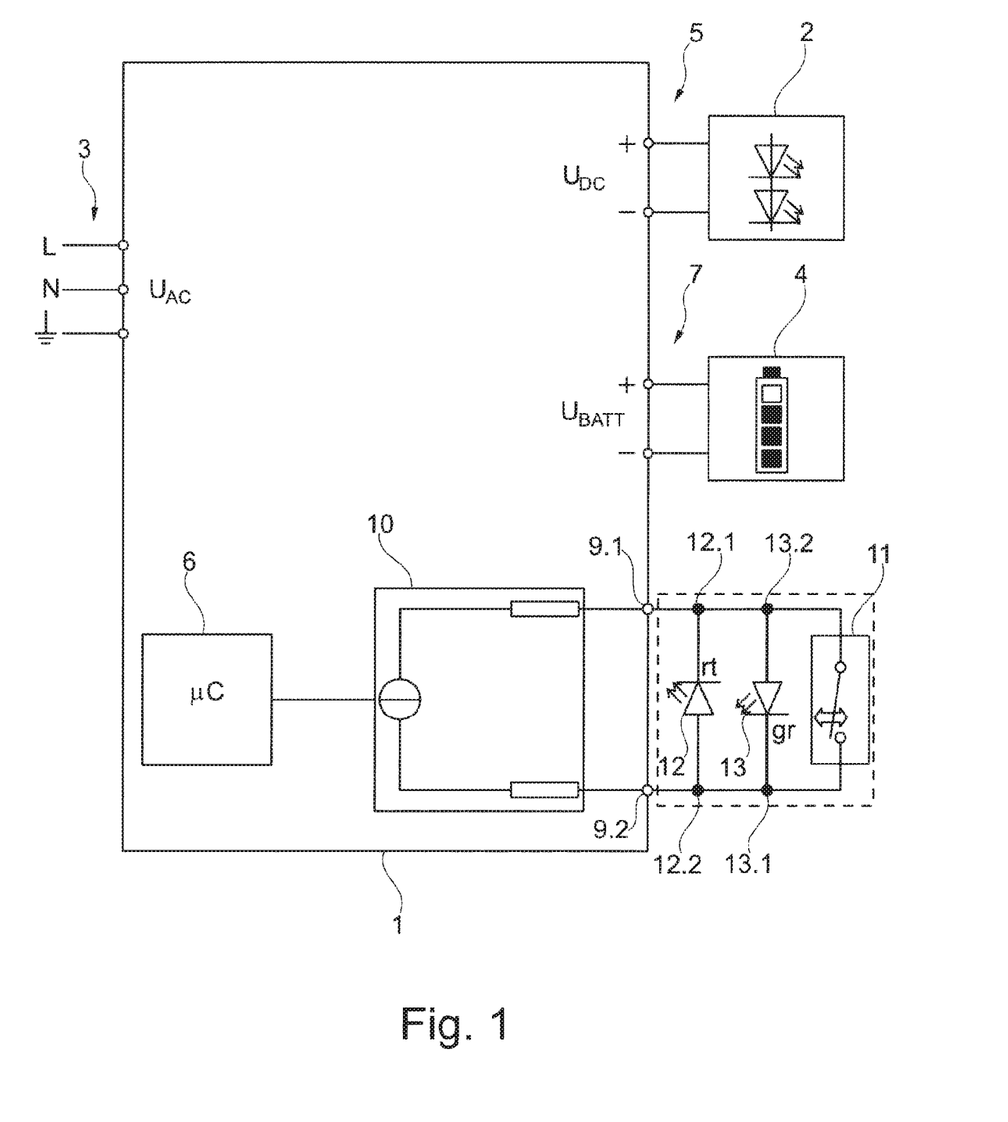
FIG. 1 shows an arrangement of an operating device and a first light emitting diode, a second light emitting diode, and a test switch according to a preferred embodiment of the invention.

An inventive arrangement comprising an operating device 1, a first light emitting diode 12, a second light emitting diode 13, and a test switch 11 according to a preferred embodiment of the invention, is shown in FIG. 1.

The operating device 1 is shown only with elements that are helpful for the representation of the invention. A mains connection 3 of the operating device is used to connect the operating device 1 to a mains voltage supply of a building, for example with an AC voltage of $U_{AC}=230$ V at 50 Hz. The operating device 1 is designed to operate one or more light modules 2 with a DC voltage $U_{DC}$ as a load at a light output 5. For example, the operating device 1 can provide a DC voltage in a voltage range of 10 to 52V with an LED current corresponding to a voltage-current at one or more light outputs 5.

The light module 2 comprises lighting means, i.e. light-emitting diodes (LEDs) in the illustrated example, which are operated by the LED current via the light connector 5. In this case, the light module 2 comprises one or more lighting means for emergency lighting operation. One, several or all lighting means of the light module 2 can be operated in the emergency lighting mode.

While the above-described elements can be typical of general types of operating devices (ballasts), the operating device 1 shown has an additional battery connection 7 for use as an operating device in the context of emergency lighting systems. An accumulator 4 is connected to the battery connector 7. The accumulator 4 is electrically charged with a charging current by the operating device 1 via the battery connector 7. In the case of emergency lighting, for example in the event of a failure of the building-side mains voltage supply of the mains voltage $U_{AC}$, the operating device 1 supplies the light connector 5 and thus the light module 2, with electrical energy from the accumulator 4 in the form of a corresponding luminous flux $I_{LED}$ during a preset rated operating time, for example, to 1 h, 2 h or 3 h.

Light connector 5, battery connection 7, and a first connection 9.1 and a second connection 9.2 of the operating device 1, in contrast to the mains connection 3, classified as SELV and internally separated from the mains connection 3 by means of a potential barrier of the mains connection 3.

The control of the operating device 1 is performed by means of a control circuit, in particular a microprocessor 6. The microprocessor 6 can not only control functions for changing operating states such as standby mode (idle mode), emergency lighting mode, charging operation of the accumulator 4, and monitoring an LED charge at the output, but can also perform functions for the different tests of the operating device and its connectors.

One or more different function tests can be triggered via an external test switch 11 or certain intervals, for example daily, weekly, annually because function tests can be determined via the test switch 4. The test switch 4 can be, for example, in the form of a rocker switch, a changeover switch, or preferably as a button.

According to the invention, the test switch 11, together with a first light-emitting diode 12, shown as a red light-emitting diode 12, and a second light-emitting diode 13, shown as a green light-emitting diode 13, are connected to a first connection 9.1 and a second connection 9.2 of the operating device 1. In particular, the first connection 9.1 is conductively connected to a first contact 12.1 (cathode) of the first light-emitting diode 12 and a second contact 13.2 (anode) of the second light-emitting diode 13. The second connection 9.2 is then conductively connected to a second contact 12.2 (anode) of the first light-emitting diode 12 and a first contact 13.1 (cathode) of the second light-emitting diode 13. The first light-emitting diode 12 and the second light-emitting diode 13 are thus connected in antiparallel to the first connection 9.1 and the second connection 9.2 of the operating device 1. The test switch 11 is connected in parallel with the light-emitting diodes 12, 13, which are connected in parallel in opposite directions, to the first connection 9.1 and the second connection 9.2.

The test switch 11 is designed to conductively connect (short-circuit) the first connection 9.1 and the second connection 9.2 when the test switch 11 is actuated.

If the first connection 9.1 and the second connection 9.2 are conductively connected to one another by means of the test switch 11, then this short circuit can be detected for the operating device 1, for example, by a voltage collapsing between the first connection 9.1 and the second connection 9.2, in particular falling below a minimum voltage value, although a limited constant current flows through the first connection 9.1 and the second connection 9.2.

In a further embodiment of the operating device 1, in particular the constant current source 10 and the microprocessor 6, the short circuit between the first connection 19.1 and the second connection 9.2 generated by means of the test switch 11, is determined by a control parameter of the constant current source 10, for example detected by timing of a switch of the constant current source 10.

The detected short circuit between the first connection 9.1 and the second connection 9.2 can be used in the microprocessor 6 to start a corresponding test procedure. In one embodiment, the duration of the short circuit is additionally determined and, in accordance with the duration of the short circuit, a function test of the operating device 10 is carried out, a function test with a predetermined test duration is started, or a functional test duration is set. For example, by operation of the test switch 11, operation of the emergency lighting means of the light module 2 can be triggered by means of energy removed from the accumulator 4.

The antiparallel circuit of the LEDs 12 and 13 with respect to the first connection 9.1 and the second connection 9.2, causes, as a function of the polarity of a voltage between the first connection 9.1 and the second connection 9.2 each one of the two light emitting diodes 12, 13, to be connected in the reverse direction, i.e. only one of the two LEDs 12, 13 lights up. The first light-emitting diode 12 and the second light-emitting diode 13 are thus specifically targeted by the direction of a current which is generated by a constant current source 10 of the operating device 1, and thus selectively targeted to the light output.

The constant current source 10 is so designed that the direction of a current imposed between the first connection 9.1 and the second connection 9.2 is reversible. A reversal of the current direction can be effected in one embodiment of the invention by switching the current direction of the constant current source 10. Thus, by means of the current direction of the current between the first connection 9.1 and the second connection 9.2, either the first light-emitting diode 12 or the second light-emitting diode 13 can be excited to emit light.

Thus, a status display of the operating device 1 by means of two LEDs in one embodiment is possible, even different colored LEDs.

Various system states can be displayed with the light emitting diodes 12, 13, wherein the constant current source 10, for example, can switch the light emitting diodes 12, 13 to the states "on", "off", "fast flashing", "slow flashing" according to certain operating and test states of the operating device 1, such as "System OK", "Run time test running", "Charge fault", "Battery fault", "Charging fault", "Emergency operation". Additionally or alternatively, other information about the operating device 1 can be output, for example, an address or the previous operating time. The output of the system status or other information can also be effected by a coded sequence of activation of the LEDs, for example, by alternating sequences of color changes and/or by different temporal sequences of outputs, for example, the activation duration or pause duration can be varied.

The constant current source 10 can comprise a first constant current source and a second constant current source according to another embodiment of the invention. The first constant current source is switched to generate a first current with a first current direction from the first connection 9.1 to the second connection 9.2 and thus excite the second light emitting diode 13 to light output. The second constant current source is switched to generate a second current with a second current direction from the second connection 9.2 to the first connection 9.1 and thus excite the first light-emitting diode 12 to light output. Alternatively, the constant current source 10 can switch the first constant current source to the first connection 9.1, or the second constant current source to the second connection 9.2. Thus, by alternately operating the first constant current source and the second constant current source, either the first light emitting diode 12 or the second light emitting diode 13 can be made to light up, although only two connections 9.1, 9.2 are provided on the operating device 1.

In a further embodiment of the invention, the first light-emitting diode 12 and the second light-emitting diode are controlled by the constant current source 10 by means of periodic current pulses in the first current direction or in the second current direction via the first connection 9.1 or the second connection 9.2. In a time $T_{OFF}$ between the current pulses, the microprocessor 6 checks whether the test switch 11 has been actuated and, accordingly, that a short circuit between the first connection 9.1 and the second connection 9.2 has been generated.

By means of a current direction at the first connection 9.1 and the second connection 9.2, as well as by detecting a charge condition, in particular a short circuit between the first connection 9.1 and the second connection 9.2, there are thus three functionalities, the operation of two LEDs for the status display and the triggering of one or more test functions only integrates one pair of connectors. By means of the arrangement according to the invention, this achieves an advantageous reduction of the connectors compared with known operating devices.

Particularly preferably, the first light-emitting diode 12, the second light-emitting diode 13 and the test switch 11 are designed to be integrated in a single component, as indicated in FIG. 1 by means of the broken line. Thus, the externally-accessible display and control elements of the emergency lighting system are arranged together at a location accessible to a user, wherein the installation effort as well as the number of modules is correspondingly and advantageously reduced.

The test switch 11 can, for example, be so designed that it is at least partially transparent, wherein the first light emitting diode 12 and the second light emitting diode 13 are disposed within the test switch 11, and, in the activated state, illuminate the transparent part of the test switch 11. Preferably, the two light-emitting diodes 12 and 13 are arranged in the movable actuating part of the test switch 11. Alternatively, however, for example, the two light emitting diodes 12 and 13 can be arranged in a fixed part of the test switch. The test switch 11 can also have two partial regions, wherein each of the light emitting diodes 12 and 13 is arranged in one of the two partial regions and thus a respective different partial region is illuminated by the two light emitting diodes 12 and 13.

Figure 2:
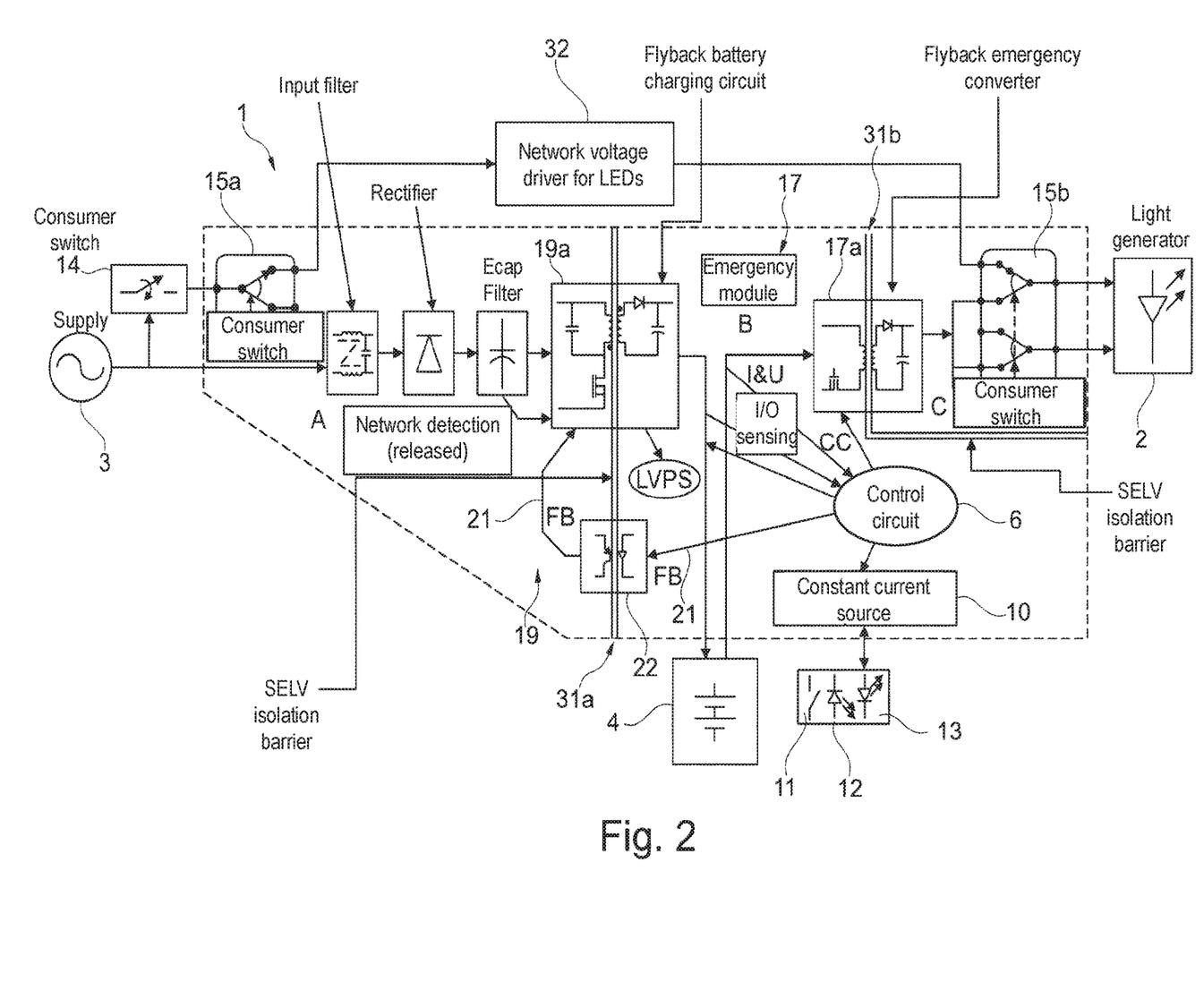
FIG. 2 shows a more detailed schematic representation of an operating device according to a preferred embodiment of the invention.

FIG. 2 shows a second embodiment of the invention. The illustrated embodiment differs from the embodiment shown in FIG. 1 in particular in that an operating device 10 is shown according to one aspect of the invention. Therein is shown schematically that the emergency lighting device 10 is divided into three areas A, B, C, which are separated from each other by a Safety Extra Low Voltage (SELV) isolation barrier 31a, 31b. An LED driver 32 for mains operation is designated in FIG. 2 as a mains voltage driver for LED. From FIG. 2, it is apparent that a first current path, starting from the mains supply source 3 via a power switch 14, a first relay 15a, the LED driver 32 for mains operation, and a second relay 15b, leads to the light source of the light module 2. This current path leads partly through the operating device 10 (illustrated in the areas A and C in which the first and the second relay 15a, 15b are arranged. In particular, the LED driver 32 and the relays 15a and 15b are optional elements, while it can also be provided that the operating device 1 operates the LED 2 even when the mains voltage 3 is present.

The first and the second relay 15a, 15b are designed to switch the charge, or the lighting means of the light module 2 from the LED driver 32 for mains operation to an emergency LED driver 17 when the mains voltage fails, or when the mains voltage moves outside a predetermined range, or a predetermined threshold is exceeded, or not reached.

It is also shown that an energy storage 18 is charged by the mains voltage via a charging circuit 19 in normal operation. The energy storage 18 then supplies, in emergency lighting mode, the emergency LED driver 17, which in turn supplies the lighting means of the light module 2 with electricity via the second relay 15b.

The relays 15a and 15b are not essential. For example, other switching elements such as semiconductor switches, or simply diode decoupling, can be used.

Likewise, an LED driver 32 for mains operation is not absolutely necessary, in that the operating device 1 can also be so designed that it can operate the lighting means of the light module 2 even when the mains voltage 3 is present.

It is also shown that the energy storage 18 is separated from the lighting means of the light module 2 by an extra-low voltage safety isolation barrier 31b.

The charging circuit 19 has, in particular, an electrical isolation element 19a, which makes it possible to bypass the insolation barrier 31a while maintaining the galvanic isolation. The potential separation element 19a is a converter and, in particular, a flyback converter, i.e. a converter with a timed switch, via which the energy storage is charged in the presence of the mains voltage, i.e. in normal operation.

Also shown is a feedback line 21 via an optocoupler 22, via which a feedback signal can be transmitted to the primary side of the charging circuit.

Also shown is the potential separation element 17a of the emergency LED driver 17, which is designed to bypass the extra-low safety voltage isolation barrier 31b while maintaining galvanic isolation, through which the energy storage as well as the secondary-side connection of the charging circuit 19 is disconnected from the light module 2 (e.g. the LED, LED track, . . . ). In the illustrated case, the potential separation element 17a is likewise a converter and, in particular, a flyback converter which is likewise operated in a timed manner.

FIG. 2 also shows a control circuit 6 which directly or indirectly determines, based on the voltage/current transmitted by the potential separation element 17a of the charging circuit, whether an emergency lighting operation is present. The control circuit 6 can, therefore, indirectly or directly detect the mains voltage (for example by means of a measurement of the voltage on the secondary side of the potential separation element of the charging circuit 19a), and thus also detect a failure of the mains voltage, or a deviation of the mains voltage by a predetermined value, or a predetermined interval. The control circuit 6 can also control the timing of the potential separation element 17a of the emergency LED driver 17, and thus control the power, the current and/or the voltage with which the lighting means of the light module 2 is supplied in the emergency mode.

In this case, the control circuit 6 can also detect the current output by the energy storage 18 or the delivered voltage, and control the operation of the status display by means of the first light-emitting diode 12 and the second light-emitting diode 13. Additional information from other modules of the emergency lighting device (from a test switch 11 for initiating a test mode) can be received, processed and/or sent to the control circuit 6.

The control circuit 6 can be in the form of a microcontroller (μC), an integrated circuit IC and/or an ASIC.

A low voltage power source (LVPS) can be provided in the region of the energy storage 18, i.e. on the secondary side of the potential separation element of the charging circuit 19a and on the primary side of the potential separation element 17a of the emergency LED driver 17. The low voltage power source (LVPS) can supply the control circuit 6 with an operating voltage.

The illustrated control circuit 6 (IC, ASIC, microcontroller) can thereby detect the current and/or the voltage with which the energy storage 18 is supplied via the potential separation element 19a of the charging circuit 19, and the voltage and/or the current from the energy storage 19 supplied to the potential separation element 17a of the emergency LED driver 17. Likewise, the control circuit 6 can also control the timing of the switch of the potential separation element 17a (converter) of the emergency LED driver 17 and signal via an optocoupler 22 a feedback signal via a feedback path 21 to the primary side of the charging circuit 19. By using the optocoupler 22, the electrical isolation between the energy storage and mains voltage 13 is obtained. The control circuit 6 can in turn evaluate additional information which is supplied, for example, from a test switch 11 and via an optional DALI interface 28. Furthermore, the control circuit can in turn drive an indicator with a status display by means of the first light-emitting diode 12 and the second light-emitting diode 13, which signals, for example, the emergency light operation to the outside. Finally, the control circuit 6 can communicate with other devices via the DALI interface.

There is a separation of the energy storage 18 from the mains voltage applied to the lighting means of the light module 2 through the insolating barrier 31b. Thus, it is possible to regulate the power supply of the lighting means of the light module 2 through the energy store 18 via the discharge current of the energy storage 18. This makes it possible to provide a greater number of different voltages to the lighting means of the light module 2, to allow the use of other potential separation elements, such as boost converters. In addition, at low cost, an energy storage device 18 with an efficiency of about 80% or more can be achieved (in quasiresonant (QR) operation).

Figure 3:
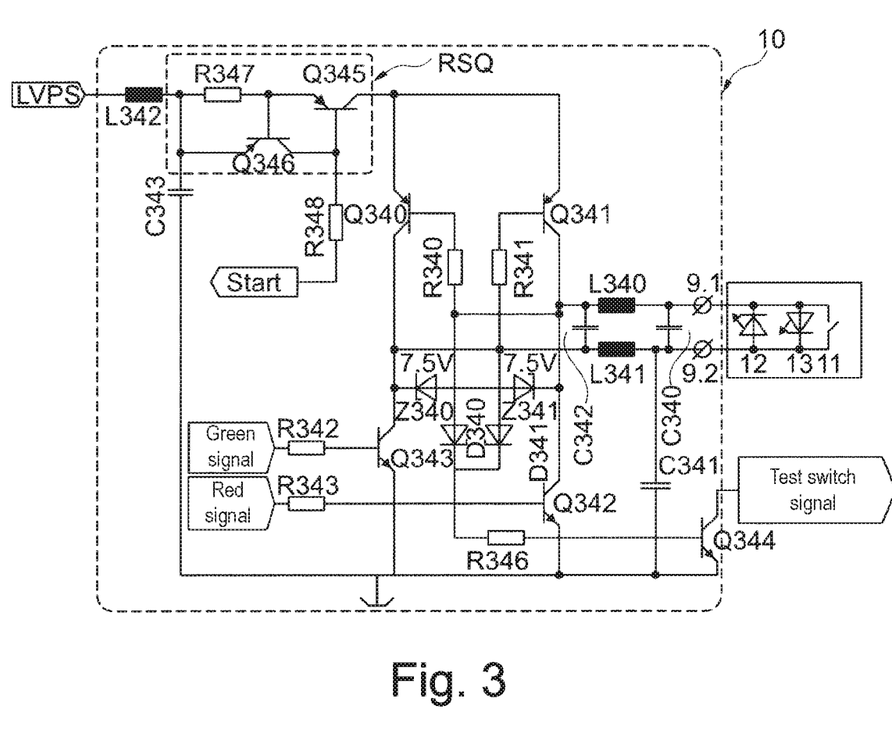
FIG. 3 shows a more detailed illustration of a constant current source according to a preferred embodiment of the invention.

FIG. 3 shows a more detailed illustration of a constant current source 10 according to a preferred embodiment of the invention. The control circuit 6 itself is not shown in FIG. 3. However, the connections 'start', 'green signal', 'red signal' and 'test switch sign' are shown, which are connected to the control circuit 6 or designed as output pins or input pins (output or input connections) of the control circuit 6.

Preferably, the constant current source 10 is supplied from an internal power supply of the operating device 1, for example, starting from the low-voltage power source (LVPS) or from the battery 4. This supply from the internal power supply of the operating device 1 via an inductance L342 of a reference current source RCS, formed from transistors Q346 and Q345 as well as the base resistor R347. The reference current source RCS can be activated or deactivated via the 'start' connection, which is supplied by the control circuit 6. In a start-up phase, the start connection can be used, for example, by applying a high level to the base of the transistor Q345 to activate the reference current source RCS. Then, two parallel current paths follow the reference current source RCS, each with a PNP transistor Q340 or Q341 connected to the emitter connector at the output of the reference current source RCS. Each of the two PNP transistors Q340 and Q341 is connected to the collector connection respectively to the collector connection of an NPN transistor Q343 or Q342. The intersection of the collector connection of the first PNP transistor Q340 and the collector connection of the first NPN transistor Q343 is connected via a second filter inductance L340 to the first connection 9.2, wherein the intersection of the collector connection of the second PNP transistor Q341 and the collector connection of the second NPN transistor Q342 is connected to the first connection 9.1 via a first filter inductance L341. The emitter connections of the NPN transistors Q342 and Q343 are each connected to ground. The base of the first NPN transistor Q343 is connected to the 'green signal' control output of the control circuit 6. The base of the second NPN transistor Q342 is connected to the control output 'red signal' of the control circuit 6. The two PNP transistors Q340 and Q341 are each arranged in the emitter circuit, wherein at the emitter of the first PNP transistor Q340, the first emitter resistor R340 is connected to the first filter inductance L340 and thus to the first connection 9.1, while the emitter of the second PNP transistor Q341 is connected via the second emitter resistor R341 to the second filter inductance L341, and thus to the second connection 9.2.

When a high level signal is output to the control circuit 6 at the 'green signal' control output, the first NPN transistor Q343 is turned on. Starting from the reference current source RCS, a current can now flow through the second PNP transistors Q341 and via the first filter inductance L340 to the first connection 9.1. Starting from the first connection 9.1, the current can flow through the second light-emitting diode 13 to the second connection 9.2. From the second connection 9.2, the current continues to flow through the second filter inductance L341 to the first NPN transistor Q343 to ground. Due to the potentials at the connectors 9.1 and 9.2 the first light-emitting diode 12 remains blocked.

When a high level signal is output to the control circuit 6 at the 'red signal' control output, the second NPN transistor Q342 is turned on. Starting from the reference current source RCS, a current can now flow through the first PNP transistors Q340 and via the second filter inductance L341 to the second connection 9.2. Starting from the second connection 9.2, the current can flow through the first light-emitting diode 12 to the first connection 9.1. From the first connection 9.1, the current continues to flow through the first filter inductance L340 to the second NPN transistor Q342 to ground. Due to the potentials at the connectors 9.1 and 9.2 the second LED 13 remains blocked.

The constant current source 10 thus has a first constant current source, which is formed by the series circuit of reference current source RCS, the first PNP transistor Q340 and the second NPN transistor Q342, and a second constant current source through the series circuit of the reference current source RCS, the second PNP transistor Q341 and the first NPN transistor Q343. Alternatively, the first or the second constant current source can be connected to the first connection 9.1 and to the second connection 9.2.

In the normal case, the operating device 1 will activate the second light-emitting diode 13, which is preferably green. For example, in the event of a fault, alternatively, the first light emitting diode 12 can be activated.

In the following, the detection of the operation of the test switch 11 will be described. It can be assumed in this case of the normal operation of the operating device 1, wherein the second light emitting diode 13 is activated. Thus, the second PNP transistor Q341 is also activated. If the two connections 9.1 and 9.2 are now short-circuited by actuation of the test switch 11, the potential of the power supply of the operating device 1 at the two connections 9.1 and 9.2 is due to the switched on second PNP transistor Q341. With both connections 9.1 and 9.2, a first diode D341 and a second diode D342 are respectively connected via the filter inductance L340 or L341. Once there is a short across the two connections 9.1 and 9.2, both diodes D341 and D342 will turn on, and thus the third NPN transistor Q344 will turn off.

As long as the test switch 11 is not actuated and thus the two connections 9.1 and 9.2 are not short-circuited, with activated light-emitting diode 12 or 13, only one diode D341 or D340 has a high potential, while the other diode is at a low potential, because there is a voltage drop across one of the two light-emitting diodes 12 or 13 and one of the two NPN transistors Q343 and Q342 is switched on, and thus the potential at its collector is drawn down. Thus, the third NPN transistor Q344 remains in the on state. The two connectors 9.1 and 9.2 are connected via an OR link of an evaluation circuit, which can be formed, for example, by a diode network (D340, D341). If both connections 9.1 and 9.2 are short-circuited and thus at the same potential, then there is another signal at the output of the evaluation circuit than if a different potential were present at the two connections 9.1 and 9.2.

There is a different potential at the two connections 9.1 and 9.2 when one of the two LEDs 12 or 13 is activated. When the test switch is actuated, the two connections 9.1 and 9.2 are short-circuited and the same potential is applied to both connections 9.1 and 9.2.

Thus, the first connection 9.1 and the second connection 9.2 are connected via an OR connection of the evaluation circuit, and the evaluation circuit signals an actuation of the test switch 11 if both connections 9.1 and 9.2 are short-circuited and thus at the same potential. This signaling of the operation of the test switch 11 by the evaluation circuit can be detected and evaluated by the control circuit 6.

When this third transistor Q344 is turned on, the potential at the collector of the third transistor Q344 is drawn to ground, which can be detected by the control circuit 6 at the test switch design input. For example, the input 'test switch sign' is connected to a pull-up resistor or an internal current or voltage source of the control circuit 6, so that when the third transistor Q344 is open, the potential at the collector of the third transistor Q344 is at a potential different from the ground potential.

The brightness of the light-emitting diodes 12 and 13 can be influenced via a corresponding driving of the first and second NPN transistors Q343 and Q342. For example, the two NPN transistors Q343 and Q342 can each be driven with a pulse-modulated signal, such as a pulse width modulated signal. Depending on the duty cycle of the pulse-modulated signal, the brightness of the LEDs 12 and 13 will change. However, it is also possible, for example, to operate the two NPN transistors Q343 and Q342 in linear operation and to switch them on to different degrees by selecting the amplitude of the base voltage. In this case, the two NPN transistors Q343 and Q342 would work as a kind of adjustable resistor.

The brightness of the light-emitting diodes 12 and 13 can be predetermined, for example, by presetting the consumer on the operating device 1, for example by programming via an existing interface or a type of configuration such as a potentiometer or DIP switch.

As an alternative or in addition to the reference current source RCS, the constant current source 10 can also have an actively timed switching regulator in order to provide a constant current for the supply of the light emitting diodes 12 and 13.

The invention claimed is:

1. An arrangement comprising an operating device (1) for emergency lighting and a first light-emitting diode (12), a second light-emitting diode (13) and a test switch (11), wherein the operating device (1) comprises:

a first connection (9.1) and a second connection (9.2), and the first light-emitting diode (12) and the second light-emitting diode (13) are connected in parallel between the first connection (9.1) and the second connection (9.2);

a constant current source (10), and the constant current source (10) is designed to impose a constant current having a first or a second polarity opposite to the first polarity between the first connection (9.1) and the second connection (9.2); and a control circuit (6) designed to detect a short circuit between the first connection (9.1) and the second connection (9.2) and also designed to control the constant current source (10) so that either the constant current of the first polarity or the constant current of the second polarity is imposed between the first connection (9.1) and the second connection (9.2);

wherein the constant current source (10) feeds a first current path and a second current path, and, alternatively, the first or the second current path can be connected to the first connection (9.1) and the second connection (9.2); and further wherein the first connection (9.1) and the second connection (9.2) are connected via an OR connection of an evaluation circuit, and the evaluation circuit signals an actuation of the test switch (11) if the first connection and the second connection (9.1, 9.2) are short-circuited and are thus at a same potential.

2. The arrangement according to claim 1, wherein the test switch (11) is connected in parallel with the first light-emitting diode (12) and the second light-emitting diode (13) and set up said short-circuit of the first connection (9.1) to the second connection (9.2) when the test switch (11) is actuated.

3. The arrangement according to claim 1, wherein the control circuit (6) is designed to detect the short circuit between the first connection (9.1) and the second connection (9.2) by determining for a limited constant current between the first connection (9.1) and the second connection (9.2), whether a voltage between the first connection (9.1) and the second connection (9.2) falls below a threshold value.

4. The arrangement according to claim 1, wherein the control circuit (6) is designed to determine said short circuit between the first connection (9.1) and the second connection (9.2) on the basis of a control parameter of the constant current source (10), in particular based on a timing of a switch of the constant current source (10).

5. The arrangement according to claim 1, wherein the constant current source (10) is designed to switch between the constant current of the first polarity or the constant current of the second polarity.

6. The arrangement according claim 1, wherein the first light-emitting diode (12), the second light-emitting diode (13) and the test switch (11) are integrated in a common module.

7. An emergency lighting system having the arrangement according to claim 1 and further comprising at least one light module (2) for emergency lighting.

* * * * *